(12) United States Patent
Benevelli et al.

(10) Patent No.: US 11,533,836 B2
(45) Date of Patent: Dec. 27, 2022

(54) ARTICULATED TRACTOR HAVING AN IMPROVED HITCH AND CONTROL METHOD THEREOF

(71) Applicant: CNH Industrial America LLC, New Holland, PA (US)

(72) Inventors: Alessandro Benevelli, Eggio Nell'Emilia (IT); Francesco Paolini, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 47 days.

(21) Appl. No.: 16/961,390

(22) PCT Filed: Jan. 10, 2019

(86) PCT No.: PCT/EP2019/050525
§ 371 (c)(1),
(2) Date: Jul. 10, 2020

(87) PCT Pub. No.: WO2019/137988
PCT Pub. Date: Jul. 18, 2019

(65) Prior Publication Data
US 2020/0359548 A1  Nov. 19, 2020

(30) Foreign Application Priority Data

Jan. 12, 2018  (IT) .................. 102018000000809

(51) Int. Cl.
*A01B 69/08*  (2006.01)
*A01B 59/04*  (2006.01)
*B62D 12/00*  (2006.01)

(52) U.S. Cl.
CPC ............ *A01B 69/006* (2013.01); *A01B 59/04* (2013.01); *B62D 12/00* (2013.01)

(58) Field of Classification Search
CPC ... A01B 69/004; A01B 69/006; A01B 69/008; A01B 59/04; A01B 9/042; A01B 59/048; B62D 12/00
USPC ........................................................ 172/282
See application file for complete search history.

(56) References Cited

U.S. PATENT DOCUMENTS

| 3,662,848 | A | 5/1972 | Magnusson |
| 4,042,053 | A | 8/1977 | Sieren et al. |
| 4,270,621 | A | 6/1981 | Van Der Lely |
| 8,577,558 | B2 * | 11/2013 | Mitchell ............. A01B 69/004 701/50 |
| 9,114,832 | B2 * | 8/2015 | Wang et al. ......... A01B 69/006 |
| 9,374,939 | B2 * | 6/2016 | Pickett et al. ......... G05D 1/021 |

(Continued)

FOREIGN PATENT DOCUMENTS

EP  1502839  2/2005

OTHER PUBLICATIONS

International Search Report and Written Opinion for International Application No. PCT/EP2019/050525 dated Apr. 23, 2019 (11 pages).

*Primary Examiner* — Tara Mayo-Pinnock
(74) *Attorney, Agent, or Firm* — Rickard K. DeMille; Rebecca L. Henkel

(57) ABSTRACT

An articulated tractor comprises a front frame, a rear frame articulated to the front frame by a central articulation, and a pivotable hitch carried by one of the front frame and the rear frame. The hitch is pivoted during steering. Front wheels are offset from the rear part of the tractor.

12 Claims, 3 Drawing Sheets

(56) References Cited

U.S. PATENT DOCUMENTS

| | | | |
|---|---|---|---|
| 2006/0142936 A1* | 6/2006 | Dix | G01C 21/005 |
| | | | 701/50 |
| 2011/0315234 A1* | 12/2011 | Diaz et al. | A01B 63/22 |
| | | | 137/51 |
| 2013/0231823 A1* | 9/2013 | Wang et al. | A01B 69/008 |
| | | | 701/24 |
| 2013/0289832 A1* | 10/2013 | Pirotais | G05D 1/021 |
| | | | 701/50 |
| 2014/0277675 A1* | 9/2014 | Anderson et al. | G05D 1/0212 |
| | | | 700/114 |
| 2014/0343813 A1* | 11/2014 | Morselli et al. | B60T 13/08 |
| | | | 701/70 |
| 2016/0306362 A1 | 10/2016 | Pickett | |

* cited by examiner

ARTICULATED TRACTOR HAVING AN IMPROVED HITCH AND CONTROL METHOD THEREOF

CROSS REFERENCE TO RELATED APPLICATIONS

This application is a US National Stage filing of International Application Serial No. PCT/EP2019/050525 entitled "ARTICULATED TRACTOR HAVING AN IMPROVED HITCH AND CONTROL METHOD THEREOF," filed Jan. 10, 2019, which claims priority to Italian Application Serial No. 102018000000809, filed Jan. 12, 2018, each of which is incorporated by reference herein in its entirety for all purposes.

FIELD

The present invention relates to an articulated agricultural or farming tractor.

In the following description with the generic term "tractor" we mean both small farming tractors and self-propelled operating machines that are vehicles dedicated to farming and to the maintenance of green space in general.

BACKGROUND OF THE INVENTION

Tractors have been developed according to wide and varying types.

For example, there are tractors with a rigid frame and with an articulated frame.

The rigid frame, although it offers a structure of the tractor that is generally simpler, does, however, have the drawback of having the central engine connected to the rigid part, in a somewhat raised position with the centre of gravity tending to be high, with a certain degree of difficulty in stability, above all when on bumpy ground. This tractor comprises an oscillating axle at a front end of the longitudinal frame that allows the possibility of adaptation to the ground.

However, this tractor does not have satisfactory steering capability, in particular in areas that are narrow and difficult to access. Indeed, this type of tractor allows steering of around 50 DEG and in any case, in a restricted field of action, requires that manoeuvres be carried out for rapid changes of direction, for example during the cultivation of an orchard.

Tractors with an articulated frame comprise two parts, articulated together centrally, the engine being arranged in the front articulated part and have non-steering wheels. Changes in direction thus take place by making the front part rotate about the articulation or central hinge. The wheels of the rear part describe the same radius as the front wheels and thus it is possible to tackle corners with a certain degree of ease. Each possible tool pulled by the rear part, with such an articulated arrangement, is more controllable.

In any case, although such tractors are very narrow, they also are unable to carry out sharp turns.

Furthermore, in order to increase the productivity of the tractor, there is a constant need to improve as much as possible the handling of the tractor by the driver, in particular when an implement is attached to the hitch.

For example, steering angle is reduced by a possible interference of wheels and the implement for a large steering angle. This requires longer manoeuvres to the driver.

Furthermore, especially on a soft ground, the pressure of the wheels may be too high and this causes difficulties to the driver, thus decreasing the productivity of the tractor.

SUMMARY OF THE INVENTION

It is the scope of the present invention to solve at least partially the above mentioned problem.

The scope of the present invention is achieved by a tractor comprising a front frame, a rear frame articulated to the front frame by a central articulation, and a hitch carried by one of the front frame and the rear frame, and steerable wheels attached to at least one of the front frame and the rear frame, wherein the hitch is controllable to pivot with respect to one of the front and the rear frames and in that the hitch and the steerable wheels are carried together on the front or the rear frame.

Pivoting of hitch provides a number of alternative configurations to help the driver during operation of the implement attached to the hitch. Preferred alternatives are disclosed in the dependent claims.

BRIEF DESCRIPTION OF THE DRAWINGS

For a better understanding of the present invention, the latter will further be disclosed with reference to the accompanying figures in which.

DETAILED DESCRIPTION OF THE DRAWINGS

Figure 1:
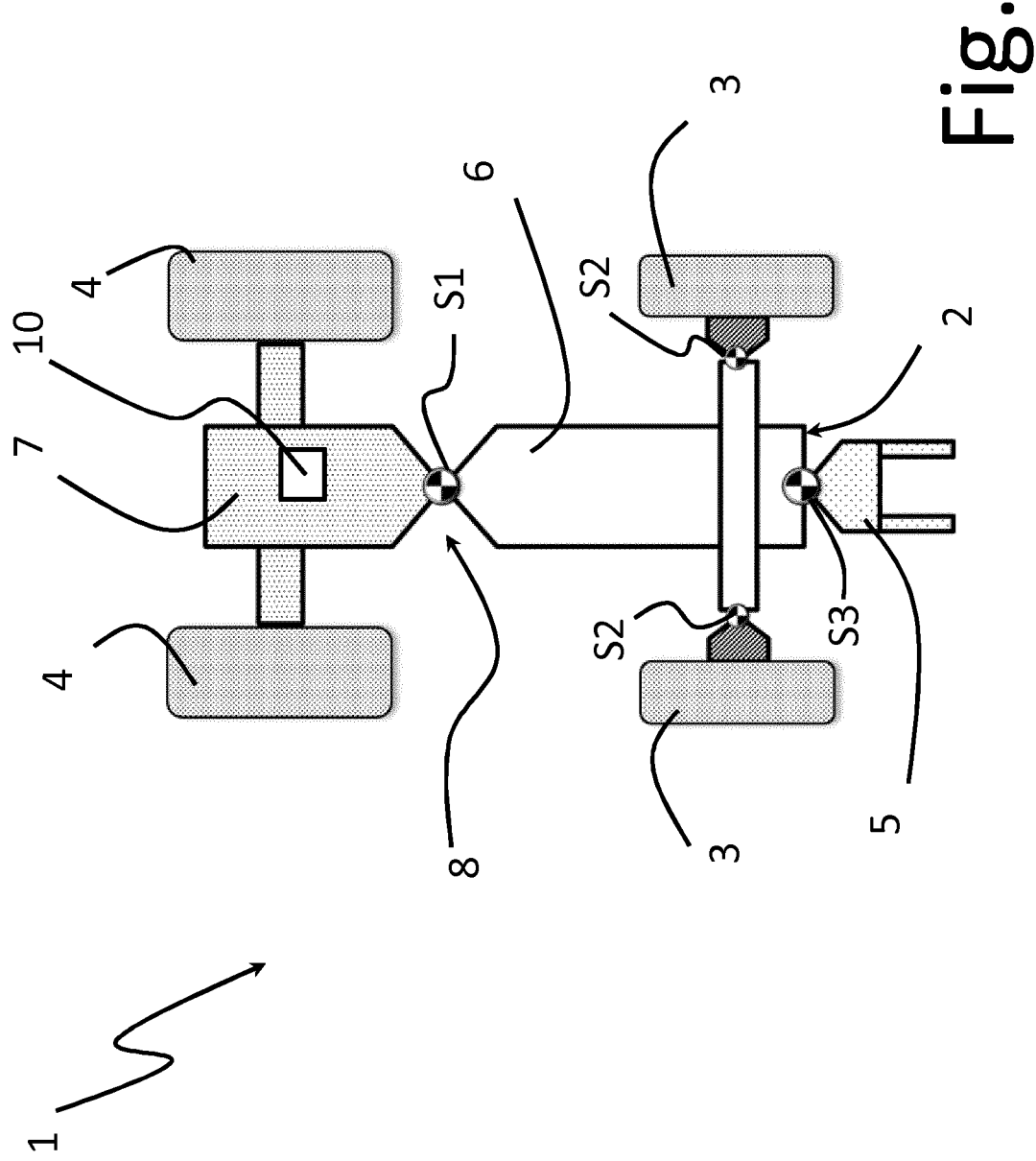
FIG. 1 shows a schematic plan view of a tractor according to the present invention.

FIG. 1 refers, as a whole, to a tractor 1 comprising an articulated chassis 2, steerable wheels 3 and non-steerable wheels or track systems 4 attached to chassis 2 and a hitch 5 attached to chassis 2 as well.

Chassis 2 comprises a front frame 6 and a rear frame 7 connected to front frame 6 via an articulation 8. Articulation 8 is for example a pivot to hinge front frame 6 and rear frame 7. According to another embodiment of the present invention, articulation 8 provides an additional rotational degree of freedom, e.g. tilting about an axis parallel to that of non-steerable wheels. This can be obtained by a spherical joint to connect front frame 6 and rear frame 7.

Hitch 5 is pivotable with respect to chassis 2 for attaching an implement. In particular, hitch 5 and steerable wheels 3 are carried by the same part of chassis 2, i.e. the front frame 6. Preferably, hitch 5 pivots about a substantially vertical axis, when tractor 1 is on a horizontal surface.

Tractor 1 also comprises a first actuator (not shown) to command relative angular position of front frame 6 and rear frame 7 about articulation 8, a second actuator (not shown) to steer steerable wheels 3 and a third actuator to control orientation of hitch 5 with respect to chassis 2. The first actuator controls a first steering mode of chassis 1 where direction of vehicle 1 is changed by changing only the relative angular position of front frame 6 and rear frame about articulation 8. During first steering mode, orientation of steerable wheels does not change.

The second actuator controls the relative angular position between steerable wheels 3 and chassis 2. According to a non limiting embodiment, steerable wheels 3 and the second actuator are carried by front frame 6.

In view of the above, steering angle of wheels 3 can be controlled independently from the relative angular position of front and rear frame 6, 7.

According to the present invention, tractor 1 is configurable in a straight line cruising mode (FIG. 2) according to which steerable wheels 3 and non steerable wheels 4 are not aligned one with respect to the other so that trailing wheels do not travel on the same path followed by the leading wheels when tractor 1 cruises along a straight direction.

To reach such an offset cruising mode, front frame 6 is rotated in one direction of rotation with respect to rear frame 7 and hitch 5 is rotated in a second direction of rotation with respect to front frame 7, the first direction of rotation being opposed to the second direction of rotation.

Figure 2:
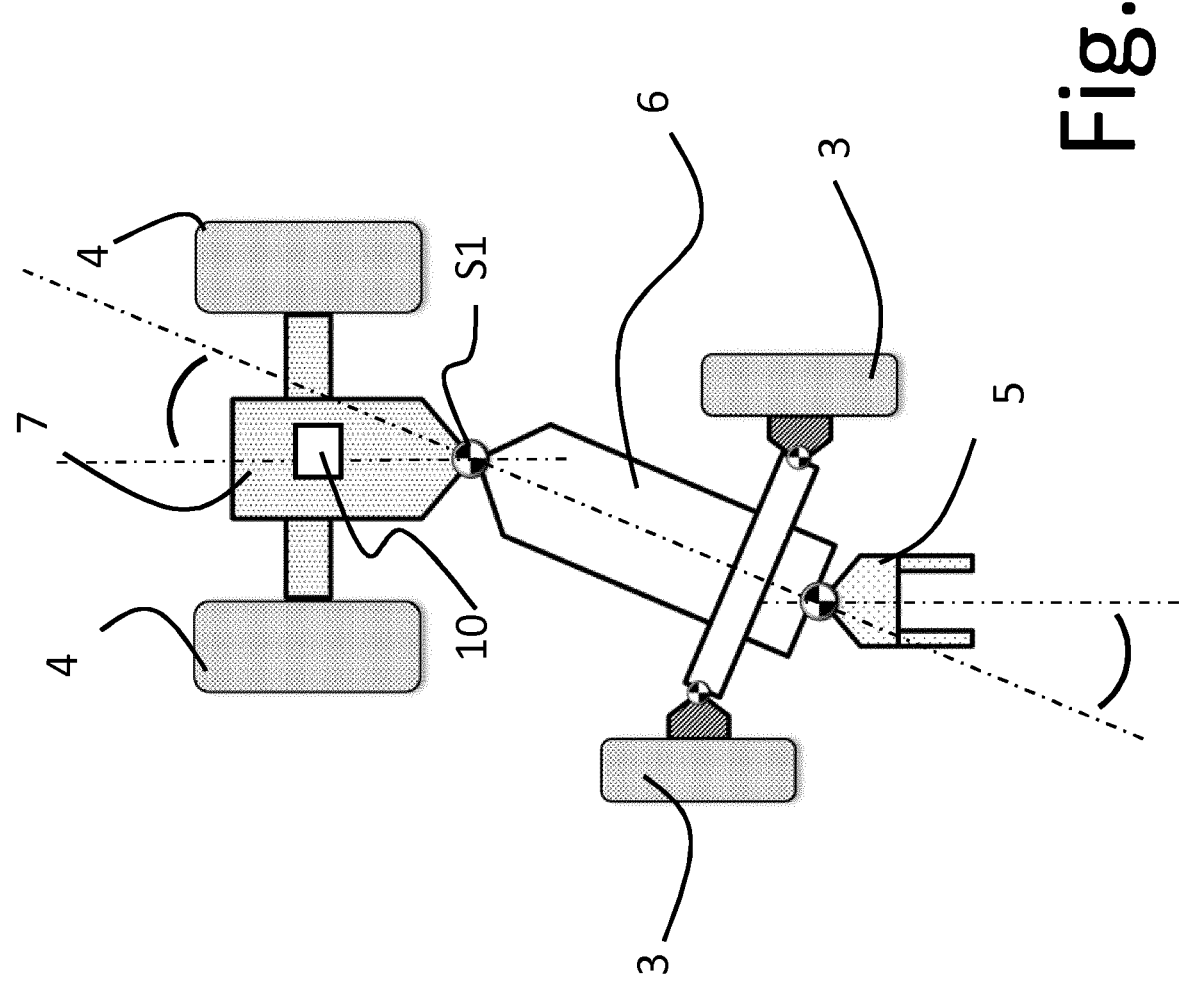
FIG. 2 is a schematic plan view of the tractor in a first working condition.

Furthermore, in the offset cruising mode, a midplane of rear wheels 4 and a midplane or centreline of hitch 5 are normally parallel (FIG. 2). It is however possible that, in certain working conditions, the user operates the third actuator in order to change the orientation of hitch 5. This may happen for example when the implement attached to hitch 5 is a snow plough or a blade.

Furthermore, in the offset cruising mode, the user may still adjust the direction of travel of tractor 1, i.e. steerable wheels 3 can be controlled independently from the orientation of the hitch 5. In particular, referring to FIG. 2 that shows a straight-cruising condition, a maximum steering of wheels 3 is asymmetrical, i.e. wheels 3 reach a first angular stop after a counter-clockwise rotation of a first angle and a second angular stop after a clockwise rotation of a second angle; the first angle is smaller than the second angle. In this case it is preferred that hitch 5 and the midplane of rear wheels remain parallel but it is also possible that hitch 5 be rotated in the same angular direction of wheels 3.

Figure 3:
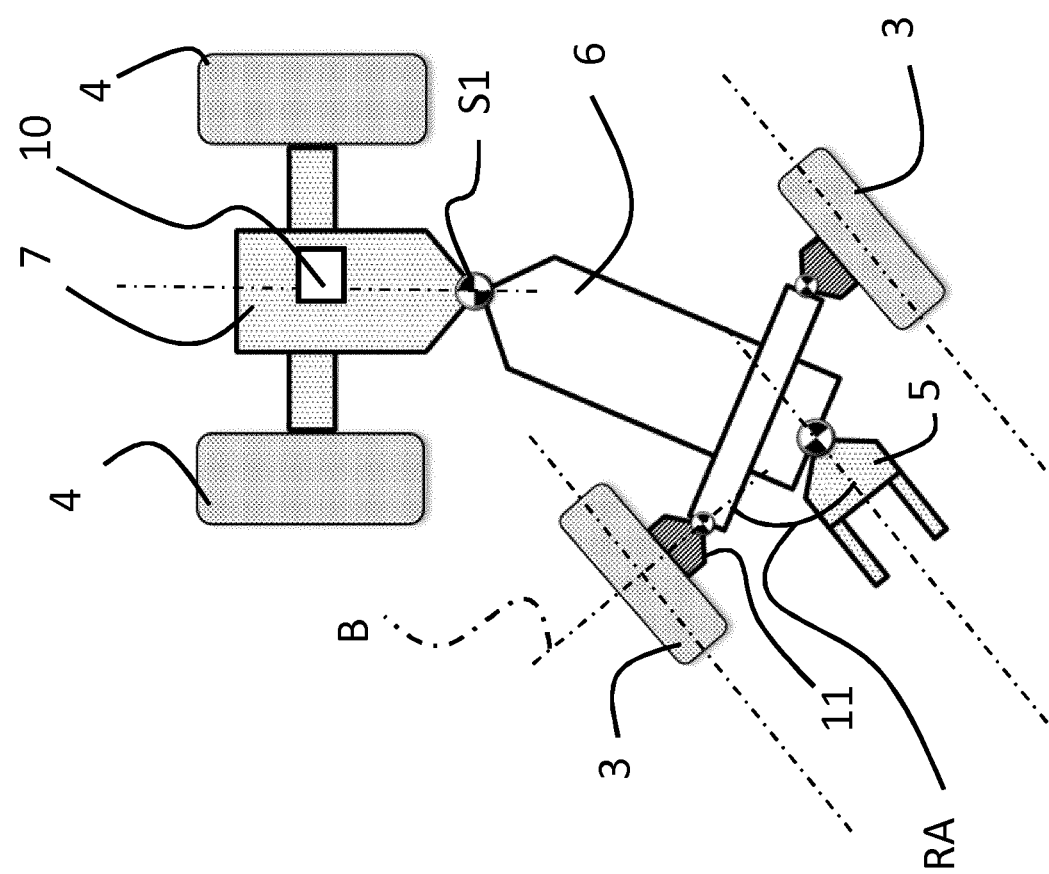
FIG. 3 is a schematic plan view of the tractor in a second working condition.

In combination to the offset cruising mode described above, hitch 5 is controllable to work also in an 'agile steering' cruising mode according to which (FIG. 3), during steering, hitch 5 and front frame 6 rotate in the same direction. Furthermore, in the agile cruising mode, steerable wheels 3 and hitch 5 rotate in the same direction.

In order to control the configuration of tractor 1, sensors S1, S2, S3 are provided to monitor a first angle between front frame 6 and rear frame 7, a second angle between front frame 6 and steering wheels 3 and a third angle between hitch 5 and front frame 6. As an alternative, an angle between hitch 5 and steerable wheels 3 is monitored instead of the second and third angles.

The sensors may either sense an angle or the angle can be calculated depending on the geometrical variable sensed by the sensor, e.g. a position or a length.

An electronic control unit 10 of tractor 1 receives signals from the sensors and controls actuators so that tractor 1 configures, subject to a command by the user, in the offset cruising mode or pivots hitch 5 during steering according to steering wheels 3.

Generally, control unit 10 is programmed so that angle RA is constant when wheels 3 are steered, so that steering wheels 3 and hitch 5 are parallel.

According to a preferred embodiment, control unit 10 controls steerable wheels 3 and hitch 5 during steering so that a relative angle RA between a centreline or midplane of hitch 5 and an axis B of a hub 11 for wheels 3 depends on speed of tractor 1 and/or phase of steering, i.e. steering or return-to-zero, and/or an indication of the intensity of a steering input by the user. In particular, an indication of the intensity of the steering command, which can be operated either by a steering wheel or a joystick, can be the angular position set by the user and/or the velocity and/or the acceleration etc. applied by the user to the steering wheel or joystick.

According to an alternative embodiment, angle RA is constant when tractor 1 travels at a speed that is below a predefined threshold. When the speed exceeds the predefined threshold, angle RA decreases, e.g. by a constant factor. This helps to increase stability of control by the user when driving at relatively high speed e.g. during cruising on a paved road. Indeed, when the speed is relatively high, it is desirable that hitch 5 and the attached implement do not rotate at all or at least do not rotate heavily when vehicle 1 steers.

Advantages of tractor 1 according to the present invention are as follows.

Controllable orientation of hitch 5 provides an increased flexibility of the attached implements. In particular, it is possible to have a reduced steering radius and avoid the interference between steering wheels and the implement attached to the hitch. In such a condition, the agricultural implement can be used to operate on the ground or the crop.

Furthermore, it is possible to use the implement when the tractor cruises along a straight line and front and rear wheels are offset (FIG. 2). This provides an improved pressure distribution on the ground. In particular, each wheel loads an uncompressed area of the ground.

A further advantage related to operating the implement in the above described offset cruising mode, is especially provided when a point of view of the user is located on rear frame 7, e.g. when a cab or cockpit is on rear frame 7. Indeed, in such a case, the part of chassis 2 carrying steerable wheels 3 and hitch 5 does not hide the operation of the implement and the user has a direct or a more direct visual overview of the implement working on the ground and of the ground itself in the immediate surroundings of the implement.

Furthermore, vehicle 1 is more agile when working close to trees because the implement can work closer to the crop without having the disadvantage of the cab encumbrance. This is in particular the case during mowing and cutting grass.

It is clear that changes and variations are applicable to the tractor according to the present invention without departing from the scope of protection as defined in the attached claims.

A track system may substitute a non-steerable wheel to obtain a hybrid wheeled-tracked vehicle. Furthermore, steerable wheels 3 may have different or equal size to non-steerable wheels 4.

Actuation of pivoting hitch 5 is any of hydraulic or electric, by a single double effect linear actuator or a couple of opposing single effect linear actuators or gears.

Steering of wheels 3 with respect to chassis 2 can be operated according to different alternatives. In particular, the steering angle of wheels 3 is solely provided by means of dedicated actuators, e.g. linear hydraulic actuators. This is for example disclosed in FR2549437.

As an alternative, steering angle is obtained as a combination of dedicated actuators, e.g. linear hydraulic actuators, and of a system such to modify the steering angle when the relative angular position of front and rear frames 6, 7 changes. For example, such a system comprises a mechanism having a connecting rod attached between a steering gear and the part of chassis 2 carrying non-steerable wheels or tracks 4. The connecting rod is offset with respect to a centerline of vehicle 1 so that, when relative angle between front and rear frame 6, 7 changes, connecting rod acts on the steering gear to change the steering angle of wheels 3 such to synchronize the change of steering angle of wheels 3 and the change of relative angular position between front and rear frame 6, 7. According to another example, the same synchronization function is obtained by a hydraulic circuit where the change of relative angle between front and rear frames 6, 7 provides a pumping action and generates a flow to actuate hydraulic steering actuators of wheels 3. According to both examples, steering of wheels 3 is in the same angular direction as that of change in relative angular position between front and rear frame 6, 7. This provides an overall enhanced steering effect of tractor 1. This is for example disclosed in EP1502839.

Furthermore, hitch 5 can tilt laterally about an axis parallel to its centerline with respect to front frame 6. This can be achieved by means of a spherical joint.

The invention claimed is:

1. An articulated tractor comprising:
   a front frame;
   a rear frame articulated to the front frame by a central articulation;
   a hitch; and
   steerable wheels attached to at least one of the front frame and the rear frame,
   wherein the hitch is configured to pivot with respect to one of the front and the rear frames, and the hitch and the steerable wheels are carried together on the front frame, the steerable wheels and the hitch pivoting together and being parallel as the steerable wheels are pivoted.

2. The tractor according to claim 1, further comprising sensors configured to determine an angular position of the front frame, the rear frame, the steering wheels, and the hitch.

3. The tractor according to claim 2, further comprising a control unit configured to receive signals from the sensors and programmed to provide:
   a. An agile steering mode wherein the hitch is controlled to pivot in the same angular direction as the steering direction, wherein the steering direction is given by actuation of the steerable wheels or by actuation of the front and the rear frames about the central articulation; and
   b. An offset cruising mode wherein the front and the rear frames are actuated to pivot about the central articulation.

4. The tractor according to claim 3, further comprising a steering wheel, and wherein an angle between the midplane of the hitch and an axis of a hub attached to the steering wheel is constant during said agile steering mode.

5. The tractor according to claim 3, further comprising a steering wheel, and wherein the control unit is further programmed to control an angle between a centreline of the hitch and an axis of a hub attached to the steering wheel based on a speed of the tractor.

6. The tractor according to claim 5, wherein the control unit is further programmed to control the angle depending on a user steering input.

7. The tractor according to claim 1, further comprising a cab on the rear frame.

8. The tractor according to claim 1, wherein the hitch is laterally tiltable.

9. A method of controlling a tractor comprising a front frame, a rear frame articulated to the front frame by a central articulation, a hitch, and steerable wheels attached to at least one of the front frame and the rear frame, comprising:
   a. pivoting the hitch in the same angular direction as a steering direction, wherein the steering direction is given by actuation of the steerable wheels and by actuation of the front and the rear frames about the central articulation, the hitch being parallel with the steerable wheels as the hitch and steerable wheels pivot; and
   b. actuating the front and the rear frames to pivot about the central articulation.

10. The method according to claim 9, wherein an angle between the midplane of the hitch and an axis of a hub attached to a steering wheel of the tractor is constant during said pivoting of the hitch.

11. The method according to claim 9, further comprising controlling an angle between a centreline of the hitch and an axis of a hub attached to a steering wheel of the tractor based on a speed of the tractor.

12. The method according to claim 11, wherein the angle is further controlled based on a user steering input.

* * * * *